Patented Dec. 26, 1933

1,940,683

UNITED STATES PATENT OFFICE 1,940,683

DISAZO DYE AND METHOD FOR ITS PREPARATION

Henry Jordan, Wilmington, Del., assignor to E. I. du Pont de Nemours & Company, Wilmington, Del., a corporation of Delaware No Drawing. Application May 17, 1932
Serial No. 611,939

9 Claims. (Cl. 260—84)

This invention relates to dyes and more particularly to azo dyes, especially those of the disazo class, and methods for their production.

The object of this invention is to produce a dyestuff having exceptional affinity for natural and regenerated vegetable fiber. A further object is to produce azo dyes which are exceedingly fast to light and washing. A still further object is to produce dyes which retain their original brilliant shades after repeated washings. Additional objects will appear hereinafter.

These objects are attained by coupling a diazotized aminoazo compound of the benzene series which contains not more than one sulfo or carboxy group to an aroyl-amino-aroyl-2-amino-5-naphthol-7-sulfonic acid, preferably a benzoyl-amino-benzoyl-2-a m i n o-5-naphthol-7-sulfonic acid.

These new dyes have the following general formula:

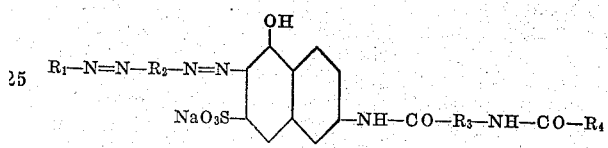

in which $R_1$ and $R_2$ are benzene radicals which together contain not more than one sulfo or carboxy group and $R_3$ and $R_4$ are benzene radicals which preferably should not contain free sulfo, carboxy, amino, or hydroxyl groups.

This invention may be more completely understood by a consideration of the following examples:

Example 1

Two hundred ninety-nine (299) parts of the sodium salt of p-aminoazobenzene-p'-sulfonic acid were dissolved with 5000 parts of water at 80° C. Then 69 parts of sodium nitrite were added and the solution was allowed to run into a mixture of ice and 280 parts of a 31% hydrochloric acid solution, maintaining a temperature of 35–40° C. The diazotization was completed in a few minutes. The diazo compound was then added to a solution of 462 parts of benzoyl-para-amino-benzoyl-J-acid in 6000 parts of water and 350 parts of sodium carbonate, maintaining a coupling temperature by the addition of ice of 5–10° C. The dye was isolated by heating the coupling to about 90° C. and salting with 10% salt.

The benzoyl-p-amino-benzoyl-J-acid may be prepared by condensing para-amino-benzoyl-J-acid in aqueous solution with benzoyl chloride at a temperature of 5–10° C., maintaining a neutral to litmus reaction by the addition of an equivalent amount of sodium carbonate.

The new dye may also be prepared by first making the coupling of diazo-aminoazobenzene-sulfonic acid with p-amino-benzoyl-J-acid and then benzoylating the finished dye. The final dye will be identical to the one described above.

The new dye was, in its dry ground form, a dark reddish powder, soluble in water with a bright bluish-red coloration; in concentrated sulfuric acid with a deep greenish-blue coloration. It dyed cotton and regenerated cellulose in bright bluish-red shades. The dyeings possessed exceptionally good fastness to washing, combined with a very good fastness to light.

The new dye most probably had the following formula:

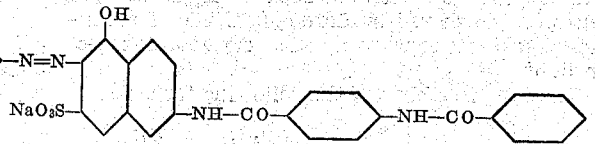

since on reduction with stannous chloride the new dye yielded p-sulfanilic acid, para-phenylenediamine and benzoyl-para-amino-benzoyl-2-amino-5-hydroxy-6-amino-naphthalene-7-sulfonic acid.

Example 2

A solution of 173 parts of p-sulfanilic acid in 4000 parts of water and 53 parts of sodium carbonate was iced to 10° C. and acidified with 280 parts of hydrochloric acid (31%). 69 parts of sodium nitrite were then added and the diazotization stirred for 30 minutes at a temperature of 10–15° C. A solution of 120 parts of m-toluidine in 500 parts of water and 132 parts of hydrochloric acid (31%) was then added and the Congo acidity neutralized with 290 parts of sodium acetate. The coupling was allowed to stir 10–12 hours at 20–25° C. The mixture was then made acid to Congo red with hydrochloric acid and filtered at 60° C. The aminoazo body was then dissolved in 5000 parts of water and 40 parts of sodium hydroxide at 25–30° C., acidified with 280 parts of hydrochloric acid (31%) and 69 parts of sodium nitrite slowly added, maintaining an excess of nitrite for 1½ hours. The mixture was then cooled to 10° C., added to 462 parts of benzoyl-p-amino-benzoyl-J-acid, and finished as in Example 1. The dry powdered dye was dark red in color, dissolving in water it gave a bright bluish-red coloration and in concentrated sulfuric acid it gave a deep greenish-blue shade. It dyed cotton a bright bluish-red shade of very good fastness to light and washing.

The dye probably had the following formula:

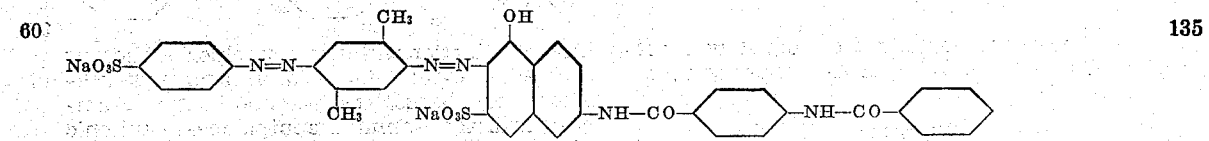

since on reduction with stannous chloride it yielded p-sulfanilic acid, 2-methyl-p-phenylenediamine and benzoyl-p-amino-benzoyl-2-amino-5-hydroxy-6-amino-naphthalene-7-sulfonic acid.

Example 3

One hundred seventy-three (173) parts of p-sulfanilic acid was diazotized as in Example 2 and a solution of 133 parts of p-xylidine in 500 parts of water and 132 parts of hydrochloric acid (31%) added. The Congo acidity was neutralized with 290 parts of sodium acetate. After stirring 10–12 hours at 20–25° C. the coupling was completed. The aminoazo body was then filtered off, diazotized and coupled to 462 parts of benzoyl-p-amino-benzoyl-J-acid as in Example 2.

The dye was reddish-black in its powdered form, its solution in water gave a bluish-red coloration while a deep greenish-blue coloration was produced in concentrated sulfuric acid. It dyed cotton a bluish-red or Bordeaux shade of exceptional fastness to washing and very good fastness to light.

The dye probably had the following formula:

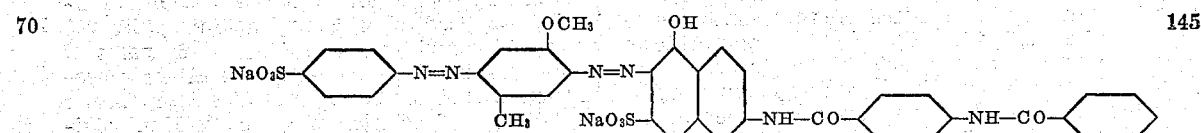

since on reduction with stannous chloride it yielded p-sulfanilic acid, 2:5-dimethyl-p-phenylenediamine and benzoyl-p-amino-benzoyl-2-amino-5-hydroxy-6-amino-naphthalene-7-sulfonic acid.

Example 4

The diazotized aminoazo body (p-sulfanilic acid-p-xylidine) prepared as in Example 3 was coupled to 462 parts of benzoyl-meta-amino-benzoyl-J-acid in 6000 parts of water and 350 parts of sodium carbonate and finished in exactly the same manner as in Example 1.

The dye was reddish-black in its powdered form, its solution in water gave a bluish-red coloration while a deep greenish-blue coloration was produced in concentrated sulfuric acid. It dyed cotton a bluish-red or Bordeaux shade of good fastness to light and washing.

The dye probably had the formula:

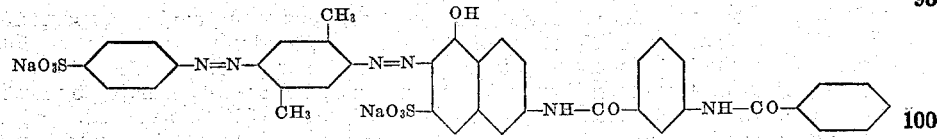

since on reduction with stannous chloride it yielded p-sulfanilic acid, 2:5-dimethyl-p-phenylenediamine and benzoyl-m-amino-benzoyl-2-amino-5-hydroxy-6-amino-naphthalene-7-sulfonic acid.

Example 5

To 173 parts of p-sulfanilic acid which had been diazotized as in Example 2, 145 parts of cresidine dissolved at 55–60° C. in 2000 parts of water and 132 parts of hydrochloric acid (31%) was slowly added, keeping the temperature of the mixture at 15–20° C. with ice. The Congo acidity was then neutralized with 290 parts of sodium acetate. The coupling was completed after stirring 10–12 hours at 20–25° C. The mixture was then made acid to Congo red paper with hydrochloric acid and filtered at 70° C. The aminoazo compound was then diazotized, added to 462 parts of benzoyl-p-amino-benzoyl-J-acid and finished just as in Example 2.

The dry powdered dye was reddish-black in color, dissolving in water it gave a bluish-violet coloration and in concentrated sulfuric acid it gave a greenish-blue shade. It dyed cotton a bluish-violet shade of very good fastness to washing.

The dye probably had the formula:

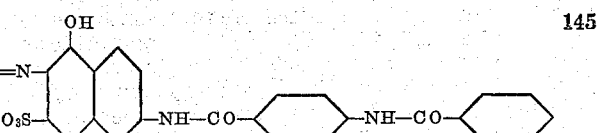

since on reduction with stannous chloride it yielded p-sulfanilic acid, 2-methoxy-5-methyl-p-phenylenediamine and benzoyl-p-amino-benzoyl-2-amino-5-hydroxy-6-amino-naphthalene-7-sulfonic acid.

*Example 6*

Just as in Example 2, 173 parts of o-sulfanilic acid were diazotized and coupled to m-toluidine, and the resulting aminoazo compound diazotized and coupled to benzoyl-p-amino-benzoyl-J-acid. The dye, in its dry powdered form was a dark reddish color, dissolving only slightly in hot water and gave a bright bluish-red coloration. In concentrated sulfuric acid it gave a deep greenish-blue coloration. It dyed cotton a bright bluish-red shade of very good fastness to light and excellent fastness to washing.

The dye probably had the following formula:

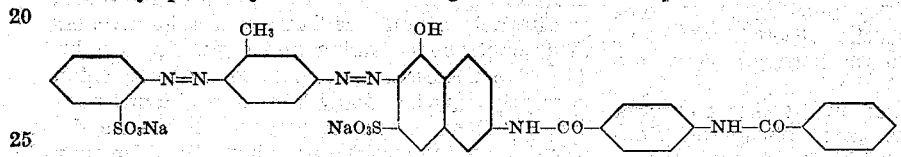

since on reduction with stannous chloride it yielded o-sulfanilic acid, 2-methyl-p-phenylenediamine and benzoyl-p-amino-benzoyl-2-amino-5-hydroxy-6-amino-naphthalene-7-sulfonic acid.

*Example 7*

A solution of 187 parts of m-toluidine o-sulfonic acid in 4000 parts of water and 53 parts of sodium carbonate was iced to 10° C. and acidified with 280 parts of hydrochloric acid (31%). 69 parts of sodium nitrite were then added and the diazo stirred for 30 minutes at 10–15° C. The diazo was then coupled to m-toluidine, the aminoazo compound filtered, diazotized and coupled to benzoyl-p-amino-benzoyl-J-acid in a manner identical to that given in Example 2. The dry dye was dark red in its powdered form, dissolving in water it gave a bluish-red coloration and in concentrated sulfuric acid it gave a deep greenish-blue shade. It dyed cotton a bright bluish-red shade of very good fastness to light and washing.

The dye probably had the following formula:

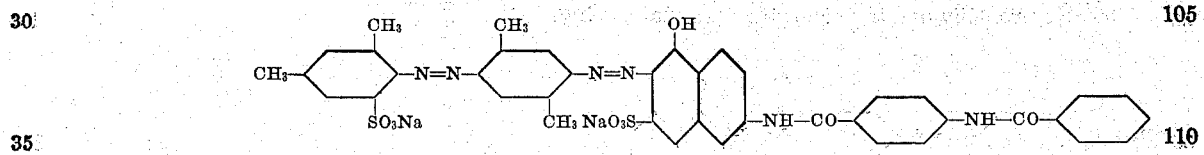

since on reduction with stannous chloride it yielded m-toluidine-o-sulfonic acid, 2-methyl-p-phenylenediamine and benzoyl-p-amino-benzoyl-2-amino-5-hydroxy-6-amino-naphthalene-7-sulfonic acid.

*Example 8*

A solution of 201 parts of m-xylidine-o-sulfonic acid in 4000 parts of water and 53 parts of sodium carbonate was acidified with 280 parts of hydrochloric acid (31%), and 69 parts of sodium nitrite added. The diazo compound was stirred 30 minutes at 20–25° C. A solution of 133 parts of p-xylidine in 500 parts of water and 132 parts of hydrochloric acid (31%) was added and then 290 parts of sodium acetate to neutralize the Congo acidity. After stirring 10–12 hours at 20–25° C. the resulting aminoazo compound was filtered, diazotized and coupled to benzoyl-p-amino-benzoyl-J-acid as in Example 2.

The dye was black in its powdered form, its solution in water gave a bluish-red or Bordeaux coloration, while a deep greenish-blue coloration was produced in concentrated sulfuric acid. It dyed cotton a bluish-red or Bordeaux shade of excellent fastness to washing and light.

The dye probably had the following formula:

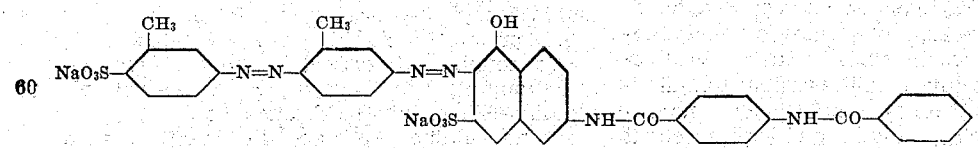

since on reduction with stannous chloride it yielded m-xylidine-o-sulfonic acid, 2:5-dimethyl-p-phenylenediamine and benzoyl-p-amino-benzoyl-2-amino-5-hydroxy-6-amino-naphthalene-7-sulfonic acid.

*Example 9*

A solution of 201 parts of m-xylidine-o-sulfonic acid was diazotized as in Example 8. A solution of 245 parts of the sodium salt of m-toluidine-omega-methane-sulfonic acid was then added followed by 200 parts of sodium acetate. After stirring 5 hours at 20–25° C. the acidity was cut back with 40 parts of sodium bicarbonate and the stirring continued for 10–15 hours. The mixture was then made distinctly acid to Congo red papers with hydrochloric acid and hydrolyzed by heating 1½ hours at 80° C. The aminoazo compound was filtered, diazotized, coupled to benzoyl-p-amino-benzoyl-J-acid and finished as in Example 2.

The dye was dark red in its dry powdered form, its solution in water gave a bluish-red coloration, while a deep greenish-blue coloration was produced in concentrated sulfuric acid. It dyed cotton a bluish-red shade of excellent fastness to light and washing.

The dye probably had the following formula:

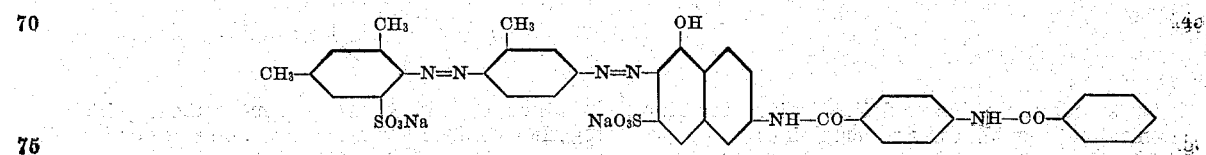

since on reduction with stannous chloride it yielded m-xylidine-o-sulfonic acid, 2-methyl-p-phenylenediamine and benzoyl-p-amino-benzoyl-2-amino-5-hydroxy-6-amino-naphthalene-7-sulfonic acid.

*Example 10*

A solution of 137 parts of p-amino-benzoic acid in 4000 parts of water and 53 parts of sodium carbonate was iced to 0–5° C. and acidified with 280 parts of hydrochloric acid (31%). 69 parts of sodium nitrite were then added and the diazo stirred for 20–30 minutes at 0–5° C. A solution of 230 parts of the Na salt of aniline-omega-methane-sulfonic acid was then added, followed by 200 parts of sodium acetate. After stirring 8–10 hours the mixture was made distinctly acid to Congo red paper with hydrochloric acid and hydrolyzed by heating 1½ hours at 80° C. The aminoazo compound was then filtered, diazotized, coupled to benzoyl-p-amino-benzoyl-J-acid and finished as in Example 2.

The dye was dark red in its dry powdered form, its solution in water gave a bluish-red coloration, while a deep greenish-blue coloration was produced in concentrated sulfuric acid. It dyed cotton a bluish-red shade of excellent fastness to light and washing.

The dye probably had the following formula:

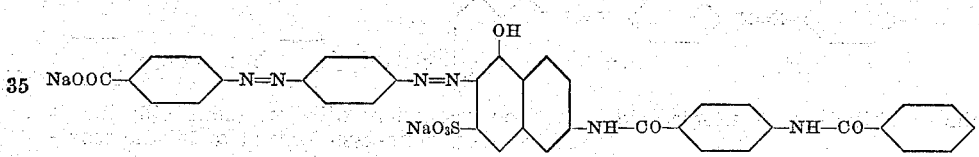

since on reduction with stannous chloride it yielded p-amino-benzoic acid, p-phenylenediamine and benzoyl-p-amino-benzoyl-2-amino-5-hydroxy-6-amino-naphthalene-7-sulfonic acid.

In the above examples very satisfactory results have been obtained by using in place of the benzoyl-para-amino-benzoyl-J-acid, the corresponding benzoyl-m-amino-benzoyl-J-acid. Very little change was noted when the benzoyl-amino-benzoyl-chain had substituted thereon groups such as halogen, alkyl, alkoxy, or nitro. However, it has been found that for optimum results, this benzoyl-amino-benzoyl-chain should not contain free sulfo-, hydroxy, carboxy, or amino groups.

As $R_1$, in the general formula given supra, it has been found that in addition to the compounds used in the above examples many other amino-sulfo or amino-carboxy acids of the benzene series, such as metanilic acid, the various toluidine-sulfonic acids, anisidine-sulfonic acids, and m-amino-benzoic acids, may be used with excellent results. In the event that the second component, $R_2$, contains an acid group free bases may used, for example, aniline and the various toludines, anisidines, xylidines, and cresidines.

For the second component, $R_2$, bases having a free para position to the amino group may be used. Some of the bases which have been found to give excellent results are ortho-toluidine, ortho-anisidine, and meta-anisidine. If the first component, $R_1$, does not contain a sulfo- or carboxy group, this group may be substituted on the second component, in which case the second component would be selected from the amino-sulfo or amino-carboxy acids having a free para position to the amino group. Meta-amino-benzoic acid in the form of omega-methane-sulfonic acid is one member of this group which has been used with excellent results.

The dyes produced by the process of the present invention have exceptional affinity for natural and regenerated vegetable fibers which they dye in beautiful bright shades. The shades produced are exceedingly fast to washing and light and retain their original brilliance and attractiveness after continued washing and exposure to light. This dye possesses a fastness to washing which is greatly superior to any known dye having benzoyl-J-acid as an end component. By the use of a proper reducing discharge medium, the color may be discharged to a pure white thereby permitting very attractive designs to be obtained by properly combining the steps of dyeing and discharging.

As many apparently widely different embodiments of this invention may be made without departing from the spirit and scope thereof it is understood that I do not limit myself to the specific embodiments thereof except as defined in the appended claims.

I claim:

1. A process for making disazo dyes which comprises coupling a diazotized aminoazo compound of the benzene series, containing not more than one sulfo or carboxy group, to benzoyl-amino-benzoyl-2-amino-5-naphthol-7-sulfonic acid.

2. A process for making disazo dyes which comprises coupling a diazotized aminoazo compound of the benzene series, containing either a sulfo or carboxy group, to benzoyl-amino-benzoyl-2-amino-5-naphthol-7-sulfonic acid.

3. A process for making disazo dyes which comprises coupling diazotized p-aminoazobenzene-p'-sulfonic acid to benzoyl-para-amino-benzoyl-2-amino-5-naphthol-7-sulfonic acid.

4. The product substantially identical with that produced by the process of claim 1, which has the following probable formula:

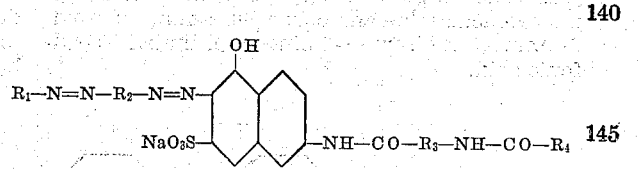

in which $R_1$ and $R_2$ are benzene radicals which together contain not more than one sulfo or carboxy group, and $R_3$ and $R_4$ are benzene radicals which do not contain free sulfo, carboxy, amino, or hydroxyl groups.

5. The product substantially identical with that produced by the process of claim 2, which has the following probable formula:

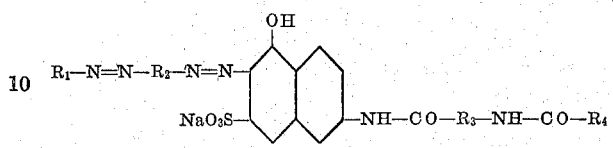

in which $R_1$ and $R_2$ are benzene radicals which together contain either a sulfo or a carboxy group, and $R_3$ and $R_4$ are benzene radicals which do not contain free sulfo, carboxy, amino, or hydroxyl groups.

6. The product substantially identical with that produced by the process of claim 3, which has the following probable formula:

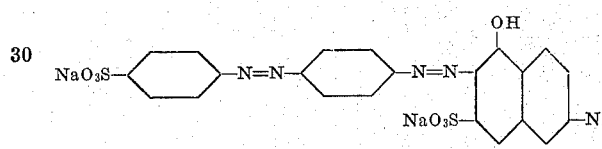

7. A secondary disazo dye of the phenyl-phenyl-naphthyl type having as an end component benzoyl-amino-benzoyl-2-amino-5-naphthol-7-sulfonic acid, the benzoyl nuclei not containing free sulfo, carboxy, amino, or hydroxyl groups.

8. A process for making disazo dyes which comprises coupling a diazotized member selected from the group consisting of amino-benzene-sulfonic acid, amino-benzene-carboxylic acid and their methyl and methoxy derivatives, with an amino-benzene having a free position para to the amino group, and which may have substituted thereon members selected from the group consisting of methyl and methoxy, diazotizing the resulting aminoazo compound and coupling it with a benzoyl-amino-benzoyl-2-amino-5-naphthol-7-sulfonic acid.

9. An azo dye having the following general formula:

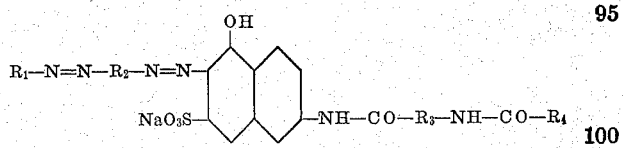

wherein $R_1$ is a benzene-sulfonic or -carboxylic acid radical which may have substituted thereon methyl and methoxy groups, $R_2$ is a benzene radical which may have substituted thereon methyl and methoxy groups, and $R_3$ and $R_4$ are benzene radicals which do not contain free sulfo, carboxy, amino or hydroxyl groups.

HENRY JORDAN.